Nov. 29, 1927.    C. MULLER    1,651,038
SAFETY ATTACHMENT FOR GAS COCKS
Filed May 27, 1927
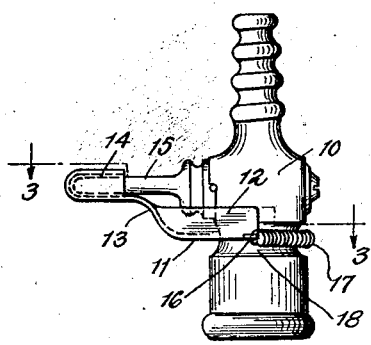
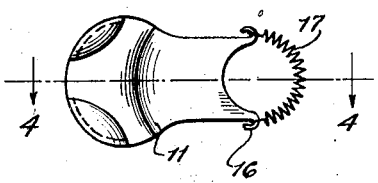
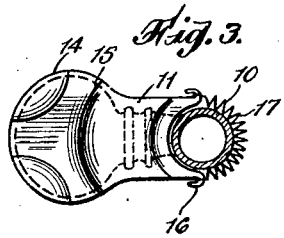
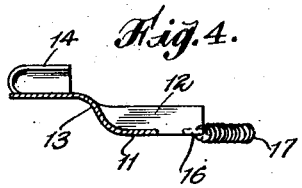
Carl Muller Inventor
By his Attorney
George C. Heinricks Patented Nov. 29, 1927.

1,651,038

UNITED STATES PATENT OFFICE.

CARL MULLER, OF BROOKLYN, NEW YORK.

SAFETY ATTACHMENT FOR GAS COCKS.

Application filed May 27, 1927. Serial No. 194,693.

This invention relates to improvements in safety attachments for gas cocks or the like to positively prevent an accidental opening of a closed cock, so as to avoid loss of life and damage to property or injury to persons by the gas escaping from a jet left inadvertently open or accidentally opened after the flame has been extinguished.

It is well known that the cocks of gas burners after being in use for any length of time become loose and worn, and thus liable to be accidentally turned on when the gas is not to be used, and it is the principal object of my invention to provide an attachment positively preventing such an accidental opening of the gas cocks and to effectively lock the cock in its closed position, while allowing a ready removal of the attachment when not to be used.

Another object and purpose of my invention is the provision of a simple and therefore inexpensive device of this kind, yet durable and efficient in operation.

A further object of my invention is the provision of a gas cock attachment for resiliently locking the cock in its closed position adapted to be readily attached to and removed from a gas burner.

These and other objects and advantages of my invention will become more fully known as the description thereof proceeds, and will then be specifically defined in the appended claims.

In the accompanying drawing forming a material part of this disclosure:

Fig. 1 is a side elevation of a conventional gas cock equipped with a safety device constructed according to my invention in locking position thereon.

Fig. 2 is a plan view of the safety device.

Fig. 3 is a top plan view of the same partly in section on line 3—3 of Figure 1.

Fig. 4 is a section on line 4—4 of Figure 2.

As illustrated in Figures 1-4, the safety device or locking device for gas cocks 10 of the conventional type consists of a body 11 or plate provided with lateral upright flanges 12 adapted to engage the side faces of the gas cock body. The outer end of the plate is bent upwardly, as at 13, out of the plane of the plate 11, and the extreme outer end of said plate is equipped with a cap or hood 14 adapted to grip over and engage the front end of the cock operating handle 15 or the like by means of which the gas valve plug is turned.

At its opposite end the plate 11 carries a hook 16 at each side to which are secured the ends of a spiral spring 17 assuming, when applied, a semi-circular form as illustrated adapted to engage with its inner face the rear part of a groove 18 provided in the gas fixture 10.

In operation, the spring is engaged with the rear part of the groove 18 and has the tendency to draw the cap 14 into engagement with the grip or handle of the gas cock when its ends are attached to the hooks of the plate while the upright flanges of the body plate engage the lateral faces of the fixture, and it will be clear that the cock cannot be accidentally opened. Evidently, the device can readily be detached from the gas cock by exerting an outwardly directed pull on the front end of plate 11 to disengage, by stretching the spring, the cap from the grip of the gas valve.

It will be understood that while I have shown and described as examples the preferred form of my device, the same may be subjected to many modifications coming within the scope of the appended claims without departing from the spirit of my invention.

Having thus described my invention, what I claim as new and desire to secure by Letters Patent is:

1. Safety attachment for locking gas cocks or the like fixtures including their valves and grips or handles therefor against accidental operation comprising a body, a means on said body for resiliently holding it to a cock, a means for engaging the side faces of the cock fixture, and a means for engaging over the free end of the gas cock operating grip or handle.

2. Safety attachment for locking gas cocks or the like fixtures including their valves and operating grips therefor against accidental operation of their valves comprising a body plate, upstanding side flanges on said plate adapted to engage laterally the cock fixture, a resilient means secured to the rear end of said plate to engage the gas fixture, and a means at the opposite end of the plate bent out of the plane thereof for engaging the end of the gas cock operating grip to prevent its accidental operation.

3. Safety attachment for gas cocks or the like fixtures including their valves and operating handles therefor to lock the same against accidental operation of their valves, comprising a body plate having hooks formed at both sides at the rear thereof, upright side flanges on said plate adapted to laterally engage the gas cock fixture, the front end of said plate being bent out of the horizontal plane thereof, and a cap on said front end adapted to engage over the front end of the gas valve operating handle; and a spring attached to said hooks.

4. Safety attachment for gas cocks including their valves and operating handles therefor, or the like fixtures, to prevent accidental opening of the valve, comprising a plate, hooks at the oppositely disposed rear ends of said plate, a helical spring having its ends secured to said hooks at both sides of the gas fixture and forming a semi-circle adapted to engage in a circular groove of the fixture, lateral uprights on said plate engaging the side faces of the gas fixture, the front end of the plate bent upwardly out of the horizontal plane of the plate, and a cap formed on the upper front end face of the plate adapted to engage over the front end of the operating handle for the gas valve and hold the same under the tension of said spring and through the engagement of the uprights with the sides of the fixture against accidental rotation.

Signed at New York in the county of New York and State of New York this 28th day of April, A. D. 1927.

CARL MULLER.